US012065270B1

(12) United States Patent
Allison

(10) Patent No.: US 12,065,270 B1
(45) Date of Patent: Aug. 20, 2024

(54) SYSTEM AND METHOD FOR ASYNCHRONOUS AUTOGENOUSLY PRESSURIZED IN-SPACE PROPULSION

(71) Applicant: Government of the United States as represented by the Secretary of the Air Force, Rome, NY (US)

(72) Inventor: Jonathan Allison, Albuquerque, NM (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 0 days.

(21) Appl. No.: 18/501,983

(22) Filed: Nov. 3, 2023

(51) Int. Cl.
  *B64G 1/40* (2006.01)
  *F02K 9/42* (2006.01)
  (Continued)

(52) U.S. Cl.
  CPC ........... *B64G 1/4021* (2023.08); *B64G 1/401* (2013.01); *B64G 1/402* (2013.01); *B64G 1/4024* (2023.08);
  (Continued)

(58) Field of Classification Search
  CPC ...... B64G 1/401; B64G 1/402; B64G 1/4021; B64G 1/4022; B64G 1/4024; F02K 9/42;
  (Continued)

(56) References Cited

U.S. PATENT DOCUMENTS 4,715,399 A * 12/1987 Jaekle, Jr. .............. B64G 1/402
  137/574

5,697,212 A * 12/1997 Koppel .................... F02K 9/50
  60/39.462

(Continued)

FOREIGN PATENT DOCUMENTS

WO   WO 2010/036291 A2   4/2010

OTHER PUBLICATIONS

McDonnell Douglas Astronautics Co., Huntington Beach, Calif. (USA), Nuclear shuttle system definition study. Phase III. Final report. vol. II. Concept and feasibility analysis. Part B. Class 3 RNS. Book 2. System definition. United States: N. p. 1971. Web. doi:10.2172/4221531. (In five parts).

(Continued)

*Primary Examiner* — Kyle Robert Thomas
(74) *Attorney, Agent, or Firm* — AFRL/RI

(57) ABSTRACT

A system for managing propellant and pressurant for in-space propulsion of a spacecraft is provided. The system includes a conformal fuel tank having an ullage operatively connected for pressurization and a propellant management device (PMD) to wick propellant to a liquid port of the conformal fuel tank. The system further includes a pneumatic circuit including a tank pressurant vent valve for adjustment of operating pressure prior to refueling operations; a vent to release excess pressurant; a pressurant metering vent valve to provide control and safety relief for the pressurant; a check valve to prevent backflow; a pressurant cat bed for decomposing propellant into pressurant; a repressurizing valve to release pressurant once cooled; a burst disk to provide overpressure safety relief; a series of propellant extraction valves to intake a predetermined quantity of propellant for decomposition; and a pressure regulator that delivers proper pressure to a series of thrusters.

1 Claim, 15 Drawing Sheets

(51) Int. Cl.
*F02K 9/44* (2006.01)
*F02K 9/48* (2006.01)
*F02K 9/50* (2006.01)
*F02K 9/56* (2006.01)
*F02K 9/58* (2006.01)

(52) U.S. Cl.
CPC .................. *F02K 9/42* (2013.01); *F02K 9/44* (2013.01); *F02K 9/48* (2013.01); *F02K 9/50* (2013.01); *F02K 9/56* (2013.01); *F02K 9/566* (2013.01); *F02K 9/58* (2013.01)

(58) Field of Classification Search
CPC ..... F02K 9/44; F02K 9/48; F02K 9/50; F02K 9/56; F02K 9/566; F02K 9/58
See application file for complete search history.

(56) References Cited

U.S. PATENT DOCUMENTS

| | | | | |
|---|---|---|---|---|
| 8,202,357 | B2* | 6/2012 | Behruzi | B64G 1/402 96/219 |
| 8,960,482 | B2* | 2/2015 | Brooks | F17C 1/12 220/560.15 |
| 9,694,916 | B2* | 7/2017 | Wernimont | B64G 1/005 |
| 2013/0119204 | A1 | 5/2013 | Allen et al. | |
| 2016/0237952 | A1 | 8/2016 | Cartage et al. | |
| 2016/0333826 | A1* | 11/2016 | Tsay | F02K 9/50 |
| 2020/0377237 | A1* | 12/2020 | Hanson | B64G 1/402 |

OTHER PUBLICATIONS

Neff, "The Decomposition of Hydroxylammonium Nitrate Under Vacuum Conditions", Master's Thesis, 69 pp., https://scholarworks.wmich.edu/cgi/viewcontent.cgi?article=1706&context=masters_theses. (In two parts).

Agnihotri, et al., "Cerium oxide based active catalyst for hydroxylammonium nitrate (HAN) fueled monopropellant thrusters," RSC Adv., 2018,8, pp. 22293-22302, (https://pubs.rsc.org/en/content/articlelanding/2018/ra/c8ra02368a#!divAbstract).

Andrews, et al., "Design of a Green Monopropellant Propulsion System for the Lunar Flashlight Mission," Master's Thesis, 25 pp., https://ssdl.gatech.edu/sites/default/files/ssdl-files/papers/mastersProjects/AndrewsD-8900.pdf.

Neff, "The Decomposition of Hydroxylammonium Nitrate Under Vacuum Conditions", Master's Thesis, 69 pp., https://scholarworks.wmich.edu/cgi/viewcontent.cgi?article=1706&context=masters_theses.

McDonnell Douglas Astronautics Co., Huntington Beach, Calif. (USA), Nuclear shuttle system definition study. Phase III. Final report. vol. II. Concept and feasibility analysis. Part B. Class 3 RNS. Book 2. System definition. United States: N. p. 1971. Web. doi:10.2172/4221531.

Hartwig, "Propellant Management Devices for Low-Gravity FluidManagement: Past, Present, and Future Applications," Journal of Spacecraft and Rockets, vol. 54, No. 4, Jul.-Aug. 2017, pp. 808-824.

* cited by examiner

SYSTEM AND METHOD FOR ASYNCHRONOUS AUTOGENOUSLY PRESSURIZED IN-SPACE PROPULSION

RIGHTS OF THE GOVERNMENT

Examples according to the present disclosure may be manufactured and used by or for the Government of the United States for all governmental purposes without the payment of any royalty.

FIELD OF THE INVENTION

The field to which the present disclosure relates to generally includes in-space propulsion systems.

BACKGROUND OF THE INVENTION

In-space propulsion systems may transfer propellant from one spacecraft to another.

SUMMARY OF THE INVENTION

Examples according to the present disclosure overcome the foregoing problems and other shortcomings, drawbacks, and challenges. While examples will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a system is provided for managing propellant and pressurant for in-space propulsion of a spacecraft. The system includes a conformal fuel tank for propellant storage and distribution, wherein the tank further comprises an ullage 111 operatively connected to the conformal fuel tank 110 for pressurization thereof. The system also includes a propellant management device (PMD) 112 within the conformal fuel tank 110, the propellant management device 112 to wick propellant to a liquid port of the conformal fuel tank 110. The system further includes a pneumatic circuit, the pneumatic circuit having a series of conduit subsystems for fluid transport and storage of propellant and pressurant. The circuit further includes a tank pressurant vent valve 146 for adjustment of operating pressure prior to refueling operations, a vent 138 to release excess pressurant, a pressurant metering vent valve 136 to provide control and safety relief for the pressurant; a check valve 144 to prevent backflow into a pressurant cat bed 130 for decomposing propellant into pressurant, the check valve 144 operatively connected between the conformal fuel tank 110 and a repressurizing valve 142, the repressurizing valve 142 to release pressurant once cooled, the repressurizing valve 142 operatively connected between the check valve 144 and the pressurant producing cat bed 130; a burst disk 140 to provide over-pressure safety relief for the pressurant, the burst disk 140 operatively connected between the pressurant-producing cat bed 130 and the conformal fuel tank 110 operatively positioned in parallel with the pressurant metering vent valve 136; and a series of propellant extraction valves 126, 128 to intake a predetermined quantity of propellant for decomposition, the series of propellant extraction valves 126, 128 operatively connected between the pressurant-producing cat bed 130 and a pressure regulator 114 that delivers proper pressure to a series of thrusters 124, the series of thrusters to propel a spacecraft.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Figure 1:
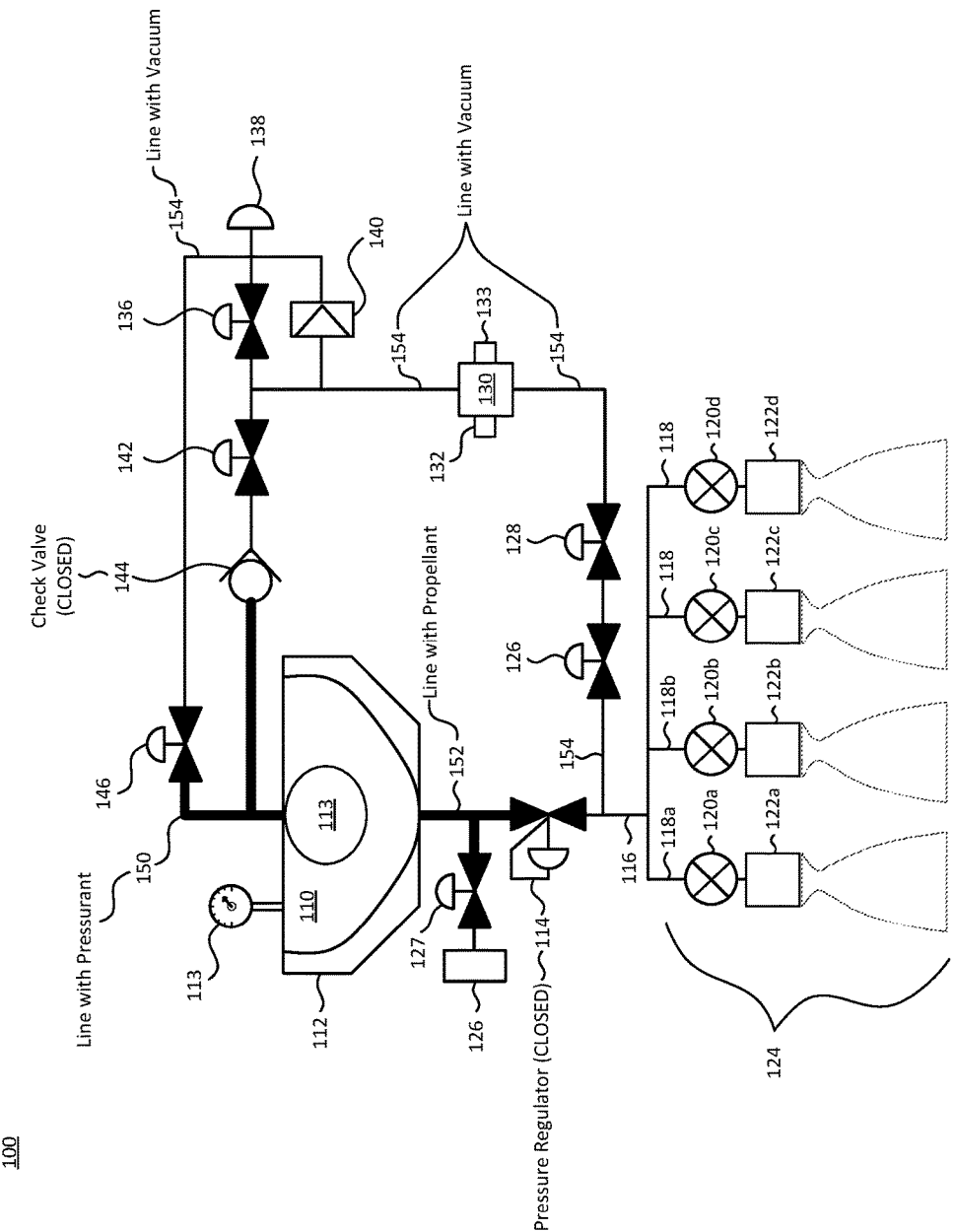
FIG. 1 is a system diagram of a system for managing propellant and pressurant for a spacecraft including asynchronous autogenously pressurized in-space propulsion with a repressurizing subsystem in operational sequence during launch phase.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

A new breed of in-space propulsion systems is currently being developed by NASA and others that relies on using gear pumps to drive propellant to chemical thrusters. This provides several advantages over the incumbent technology (pressure regulated blowdown which uses a fixed quantity of high pressure stored pressurant to push propellant to the thrusters): it permits low pressure tanks which permit fuel to be stored in 'conformal' (rather than spherical) tanks which enable compact propulsion systems and it also provides an easy means to transfer fuel amongst spacecraft in space logistics applications. A conformal tank is one that can change shape to accommodate various fill levels. One downside to spherical tanks and their related sub-systems is that gear pumps are known for their unreliability and could be life-limiting for the propulsion system and thus the spacecraft. Examples according to the present disclosure provide a novel means to pressurize the spacecraft: generating pressurant onboard by decomposing the fuel itself. Examples according to the present disclosure include Asynchronous Autogenously Pressurized In-Space Propulsion (A2P2). A2P2 enables the spacecraft to provide pressure whenever needed, in whatever quantity, from a virtually limitless supply. This gives incredible operational flexibility which can be leveraged to achieve lower size and weight of propulsion systems, higher performance propulsion systems, and simpler fuel transfer logistics for space logistics architectures.

The purpose of this invention, examples of which will be described herein as related to "Asynchronous Autogenously Pressurized In-Space Propulsion" (A2P2), is to enable the "Green propellant revolution" and to avoid the use of gear pumps. Some definitions are in order. The "green propellant revolution" is a loosely defined term that captures the ongoing revolution in in-space propulsion that is enabled by new 'green propellants' and attendant technology changes in in-space propulsion. 'In-space propulsion' is rocketry in space (as opposed to launch vehicles). In-space propulsion differs from launch vehicle propulsion in one primary way: launch vehicle propulsion has an operational lifetime of a few hours whereas in-space propulsion has an operational lifetime of a few years to many years. Thus in-space propulsion uses 'storeable' propellants that may be easily stored over long time periods. 'Green propellants' is a name for a class of propellants for in-space propulsion that are storeable but much safer to use. There are a variety of green propellants but they tend to be ionic liquids (or liquid mixtures), often derivatives of ammonium nitrate. HAN, hydroxylammonium nitrate, is a common such ionic liquid investigated as a green propellant. Green propellants are a 'monopropellant' which means that only one fluid is required as the fuel and that fluid can be violently decomposed by a catalyst to provide the energy to generate thrust. The typical (non-green) monopropellant in use today is hydrazine. Monopropellants are in contrast to bipropellants which require a fuel and an oxidizer to be stored separately and mixed together and combusted in the thruster. Green propellants, in some cases, offer better specific impulse (i.e. performance) than the heritage hydrazine, in addition to their safer handling characteristics. Wrapping up the definition section, let's discuss gear pumps: gear pumps are a type of pump that operates by grinding two gears together in such a way that fluid is force through as well. Gear pumps are intensely tribological (i.e. a lot of contact between moving solid parts) and are thus prone to frequent failures and short lives. This has been borne out in space experience via the experiences of Skylab, Mir, and other applications in which gear pumps were used for extended periods of time in space. Nevertheless, gear pumps are today considered an exciting part of the green propellant revolution because they offer the ability to avoid the need for conventional pressure regulated blowdown systems. These conventional systems operate by storing pressure energy in a tank of pressurant. The pressurant pushes propellant out of the tank, through propellant lines (aka "prop lines"), to the thrusters. This solution is conventional because it is reliable. Green propellants tend to be more viscous which forces designers to consider larger diameter prop lines which has knockon system costs and to operate at higher pressures which increases the costs of designing pressurant systems. Thus gear pumps seem like a convenient alternative. Another important benefit of using a gear pump is that the pressure in the fuel tank can be much lower which permits the tank shape to change from a sphere (with its shape's inherent resistance to pressure) to a 'conformal fuel tank' which can take whatever shape the mission has available to the tank. This offers considerable volume savings in the spacecraft, and volume is at a premium in small spacecraft. The NASA Lunar Flashlight mission intends to use just such a combination of green propellant, gear pumps, and conformal fuel tank. Lunar flashlight goes a step further and uses additive manufacturing techniques to achieve a revolutionary new smallsat propulsion system. This design is probably a very good one for Lunar Flashlight's purpose of a relatively short mission life and acceptance of substantial risk, but it is less suited to applications where greater reliability is needed such as in smallsats with longer mission lives or part of space logistics programs in which logistics spacecraft must support other spacecraft over long timeframes. The key need is to enable the Green Propellant Revolution to have an alternative to gear pumps. That is the purpose of examples according to the present disclosure.

A2P2 solves the need to have a reliable Green Propulsion system available to missions that need it.

Examples according to the present disclosure were born out of the recognition that the NASA Lunar Flashlight prop system is an ingenious design but that it is only suited for short duration, low reliability missions. The USSF is interested in space logistics and the ability to refuel spacecraft. This requires at least some of the spacecraft in a space logistics architecture to have high reliability. The Lunar Flashlight prop system architecture is well-suited to the needs of the USSF but it needs an alternative means of driving flow through the prop system. A2P2 provides a simple (aka reliable) means of achieving this with existing, high reliability spacecraft propellant components.

A2P2 is useful to spacecraft, and multi-spacecraft mission architectures, that intend to take advantage of the inherent benefits of green propellants but which need better reliability than gear pumps (a typical design with green propellant missions) can offer. This invention teaches against the use of gear pumps.

A2P2 is especially useful in space logistics architectures in which the number of different types of consumables in the architecture must be minimized. An example: it is common for today's communications satellites to have 4 different fluids: monomethyl hydrazine as a bipropellant fuel, nitrogen tetroxide as a bipropellant oxidizer, Helium as a pressurant to driven the bipropellants, and Xenon as an electrical propulsion propellant.

An ionic liquid fuel can be used as a monopropellant (so no oxidizer required) and it can be used as a propellant for electrical propulsion (EP) (so no separate fluid needed for EP). If the pressurant can also be eliminated, then that leaves only a single consumable to be managed in the logistics chain, significantly simplifying operations.

A2P2 provides a means by which a small amount of green propellant can be converted into a large amount of pressurant, thus enabling a single-fluid logistics chain.

Pressure-regulated blowdown systems and gear pumps have both been previously described as incumbent technologies, alongside their disadvantages.

Various means of transferring propellant from one spacecraft to another are available, each having disadvantages relative to the technique proposed in the present disclosure:

1) Ullage recompression—in this case a servicer tank transfers propellant to a client tank at a lower pressure. Propellant flows down the pressure gradient into the client tank. The client tank's ullage (void space) is 'recompressed' because the increasing quantity of fuel in the client tank forces the fixed mass of gas in the ullage into a smaller space. There are inherent limitations to this since the gas in the ullage pushes back which means that the size and fill quantity of the two tanks must be carefully designed. Accordingly, ullage recompression is a 'rigid' design in that it only works properly for expressly designed mission scenarios. Missions that need the flexibility to transfer in a wide range of scenarios will find ullage recompression to be untenable. An advantage of ullage recompression is that it is simple—it does not require any management like venting or active pumping.

2) Venting consumable pressurant—this technique works like ullage recompression except the gas in the client's ullage is partially vented prior to prop transfer to permit a more complete transfer of propellant and/or to suit the needs of a particular refueling scenario. This is particularly helpful since typical pressure-regulated blowdown type propulsion systems will have the quantity of pressurant gas increasing in the client tank as the client tank depletes of fuel. In this scenario, ullage recompression refueling amounts to trying to cram more gas into a smaller volume than was in that volume when the tank was originally filled. Thus, venting consumable pressurant provides the ability to 'reset' the gas quantity in the client tank. The downside of this technique is that its wasteful of pressurant. In a space logistics scenario, the pressurant can become a valuable commodity if the tank must be refueled multiple times. Venting this valuable pressurant to space turns the pressurant into a consumable and a nonrenewable one at that.

3) Recompressing the pressurant—the issues with venting the pressurant next lead to the idea that perhaps the pressurant should be reused. Unfortunately, this is not a realistic solution as the pressure in a pressurant tank is exceedingly high and such pressures cannot be realistically generated in space—only large ground support equipment is suited for this task at this time. Thus, this third option is not a realistic solution, unlike the other solutions mentioned here.

4) Gear pumps—gear pumps represent a significant departure from the previous options. A gear pump can easily produce much more pressure than whatever pressures are in the client and the servicer. This means that concerns about managing ullage are much less pressing and the gear pump can do whatever is needed. This offers tantalizing flexibility in performing transfers but it comes with the downside that gear pumps are low reliability. Low reliability is not acceptable in a logistics situation. If your car breaks down on the road, would you want an unreliable tow truck? Ergo—logistics chains permit clients to be less reliable in exchange for making servicers more reliable.

5) Another prospective refueling option would be to use capillary action (i.e., wicking)—in general this is likely to be too slow of a process for refueling and needs further development.

What is needed is a means by which the pressurant can be made less valuable (i.e., more available) so that option #2, Venting consumable pressurant becomes a viable means of prop transfer. A2P2 accomplishes this by 'storing' the pressurant in the liquid state as the propellant. This allows only a single consummable fluid to be used (good logistics) and also stores the pressurant in a very dense and safe state. This means that the system incurs very little loss of propellant whenever repressurization events are necessary and thus enables the spacecraft and multi-spacecraft mission architecture to 'Logistic without regret.'

A2P2 reduces a spacecraft and/or logistics architecture to only a single consumable. The high gas volume-to-liquid density ratio for monoprops means that there is very little waste whenever repressurization is needed. Thus there is no need to design for pressurant consumption, ullage recompression, or pump unreliability. A2P2 enables simple refueling without a gear pump. A2P2 with a propellant management device (PMD), can achieve conformal fuel tanks. A PMD is a capillary device commonly used in in-space propulsion that wicks the liquid to the outlet of a propellant tank, since there is no gravity force to draw it to the 'bottom'. The primary alternative to a PMD is a PED (positive expulsion device) which is a flexible bladder with pressurant on one side and propellant on the other. As the pressurant fills volume, it positively expels liquid volume out of the other end of the tank. PEDs are commonly used if there is a concern about mixing pressurant gas into the propellant. PMDs are commonly used if PED bladder material does not have materials compatibility with the propellant. A PED is less-suited to a conformal tank design than a PMD since a PED bladder seeks to fill an approximately spherical shape whereas PMDs can be designed to fill any space by those skilled in the art of PMD design.

A2P2 enables the operating pressure of its propulsion system to be highly adjustable. This permits A2P2 to perform the tasks of either a client or servicer in a refueling situation without any additional hardware. This androgynous refueling capability permits huge amounts of operational flexibility.

The components required to implement A2P2 are already existing or require minor changes, and primarily consist of high reliability spacecraft valves. This provides confidence that a space qualified A2P2 can achieve better lifetime reliability than a gear pump system.

Until now the 'asynchronous' aspect of A2P2 has not been mentioned. Autogenous pressurization (i.e., the use of combusted propellant to pressurize the propellant tank) is in regular use by launch vehicles. This can provide such vehicles some simplicity relative to other means of pressurizing launch vehicles (e.g., turbopumps) but is still incredibly complex. Remember—launch vehicles operate for a few hours, in-space vehicles operate for many years—as a result, much simpler, more reliable means of propulsion are required for in-space vehicles. Thus, the term 'asynchronous autogenous pressurization' is introduced herein refer to the fact that A2P2 does not require the autogenous pressurization to occur simultaneously with the rocket burn, rather the pressurization is produced well before the thruster burn and then the thruster burn is driven by a typical pressure-regulated blowdown system. The pressurization novelty of examples described herein can be restricted to just the pressurization subsystem—the rest of the system uses good, standard practices.

One Potential Challenge is that the decomposition products of the propellant will tend to dissolve in the fuel (up to some limit of solubility). The risk is that these decomposition products could then poison (oxidize) the catalyst beds (i.e., "cat beds") in either the thrusters or in the pressurant generation subsystem. Indeed, this cat bed poisoning is the key life-limiting aspect of today's monopropellant thrusters, as the same decomposition products are created in the thruster as the A2P2 proposes to use as pressurant. So, the question here is really a matter of increased degree, not entirely new behavior. Still, the total soluted mass of pressurant decomposition products in the propellant is unlikely to be substantial relative to the quantity of decomposition products that the propellant itself can produce. New catalysts for green monoprops may be able to alleviate this concern.

Examples of various embodiments as described herein start with the components typical to a monoprop pressure-regulated blowdown system with a few exceptions and include the following:

1) A conformal propellant tank. Typical spacecraft today use non-conformal fuel tanks, but conformal tanks in and of themselves are known prior art. The conformal propellant tank has a PMD in the conformal tank.

2) Piping (aka conduit) going from the conformal propellant tank to a forward pressure regulator (herein described also as "pres reg") which permits flow through the pres reg in order to meet a designed setpoint pressure downstream ('forward') of the pres reg.

3) A prop line network routing prop lines from the pres reg to the location of one or more thrusters throughout the spacecraft.

4) Valves for commissioning and possibly decommissioning the thruster system and any one or more thrusters at a time.

5) Monoprop thrusters.

6) Other features such as pressure sensors, temperature sensors, filters, fill and drain lines, fill and drain valves, heaters, etc. that are standard on such prop systems, known to those skilled in the art, required for operation of typical monoprop thruster systems, and immaterial to this invention. These items will not be discussed further.

7) Couplings and shutoff valves to connect to a servicer spacecraft to accept or deliver fuel transfer.

This invention also includes other components whose particular functions are novel but which already exist in common propulsion systems. These comprise the novel repressurizing subsystem (RPS), the RPS components include:

8) Two propellant extraction valves (one upstream and one downstream)—the space between these valves defines how much liquid volume is extracted to be converted into pressurant. These two valves may be replaced by a sampling valve that provides for space qualified requirements.

9) A pressurant producing cat bed (PPCB). Typical cat beds are designed as part of monoprop thrusters. These cat beds are incorporated into the RPS to convert propellant into pressurant.

10) Cat bed heaters to warm the cat beds up to the required catalyzing temperature (hundreds of degrees C.).

11) Thermal control components for managing the exothermic heat generated in the cat beds during decomposition and for keeping the hot cat beds from overtemping other parts of the spacecraft. One place for the PPCB is on the external face of the spacecraft to keep it away from sensitive components.

12) A pressurant metering vent valve (PMVV) which is a latch valve with quick response times which can act as a back-pressure regulating valve to vent excess pressure in the PPCB to space and achieve an adjustable, target setpoint pressure in the PPCB to deliver an intended pressure to the tank.

13) A vent that is moment and thrust free (achieved by venting equally in two or more opposing directions) and that does not vent near contamination sensitive surfaces such as optics and thermal radiators.

14) An emergency burst disk that provides last-ditch overpressurization relief to the PPCB in a failure scenario. Note that the PMVV can also be controlled to automatically open in response to measured overpressure events as a first response to overpressurization emergencies.

15) A Repressurizing valve (RV) that is a latch valve that releases generated pressurant to the ullage of the tank.

16) A Check Valve (CV) that prevents backflow from the tank's ullage to the PPCB, even if the RV is open.

17) A Tank Pressurant Vent Valve (TPVV) that routes from the tank ullage to the vent to permit the tank pressurization to be reduced by venting the ullage. This is particularly useful prior to refueling efforts.

Detailed descriptions and graphics of the connectivity of the A2P2 propulsion system are shown and described in relation to FIGS. 1-15 including sequential graphics describing the sequence of events to accomplish thruster burns, refueling, repressurization, and emergency response. The reader is hereby directed to FIGS. 1-15 for a more thorough discussion of these topics.

According to one embodiment of the present invention a system 100 is provided for managing propellant and pressurant for in-space propulsion of a spacecraft. The system 100 includes a conformal fuel tank 110 for propellant storage and distribution, wherein the tank 110 further comprises an ullage 111 operatively connected to the conformal fuel tank 110 for pressurization thereof. The system also includes a propellant management device (PMD) 112 within the conformal fuel tank 110, the propellant management device 112 to wick propellant to a liquid port of the conformal fuel tank 110. The system further includes a pneumatic circuit, the pneumatic circuit having a series of conduit subsystems for fluid transport and storage of propellant and pressurant. The circuit further includes a tank pressurant vent valve 146 for adjustment of operating pressure prior to refueling operations, a vent 138 to release excess pressurant, a pressurant metering vent valve 136 to provide control and safety relief for the pressurant; a check valve 144 to prevent backflow into a pressurant cat bed 130 for decomposing propellant into pressurant, the check valve 144 operatively connected between the conformal fuel tank 110 and a repressurizing valve 142, the repressurizing valve 142 to release pressurant once cooled, the repressurizing valve 142 operatively connected between the check valve 144 and the pressurant producing cat bed 130; a burst disk 140 to provide overpressure safety relief for the pressurant, the burst disk 140 operatively connected between the pressurant-producing cat bed 130 and the conformal fuel tank 110 operatively positioned in parallel with the pressurant metering vent valve 136; and a series of propellant extraction valves 126, 128 to intake a predetermined quantity of propellant for decomposition, the series of propellant extraction valves 126, 128 operatively connected between the pressurant-producing cat bed 130 and a pressure regulator 114 that delivers proper pressure to a series of thrusters 124, the series of thrusters to propel a spacecraft.

Next will be an example of a system and method according to the present disclosure. The system is generally a representative pneumatic operation including a system of lines (also referred to as conduit or pipes) having pressurant with associated controlled (or managed) flow; propellant and associated controlled/managed propellant flow, valves of various types, and vacuum within the system overall, resulting in push/pull operation for pressurant and propellant at various cycle steps. Note the various phases of operation in the exemplary system as shown and described below.

Referring now to FIG. 1—for Launch: Valves are closed. Vacuum or pad pressure is in all lines. Initial tank pressurant can be either a typical pressurant (He, N) or it can be the same decomposition products used on-orbit.

Figure 2:
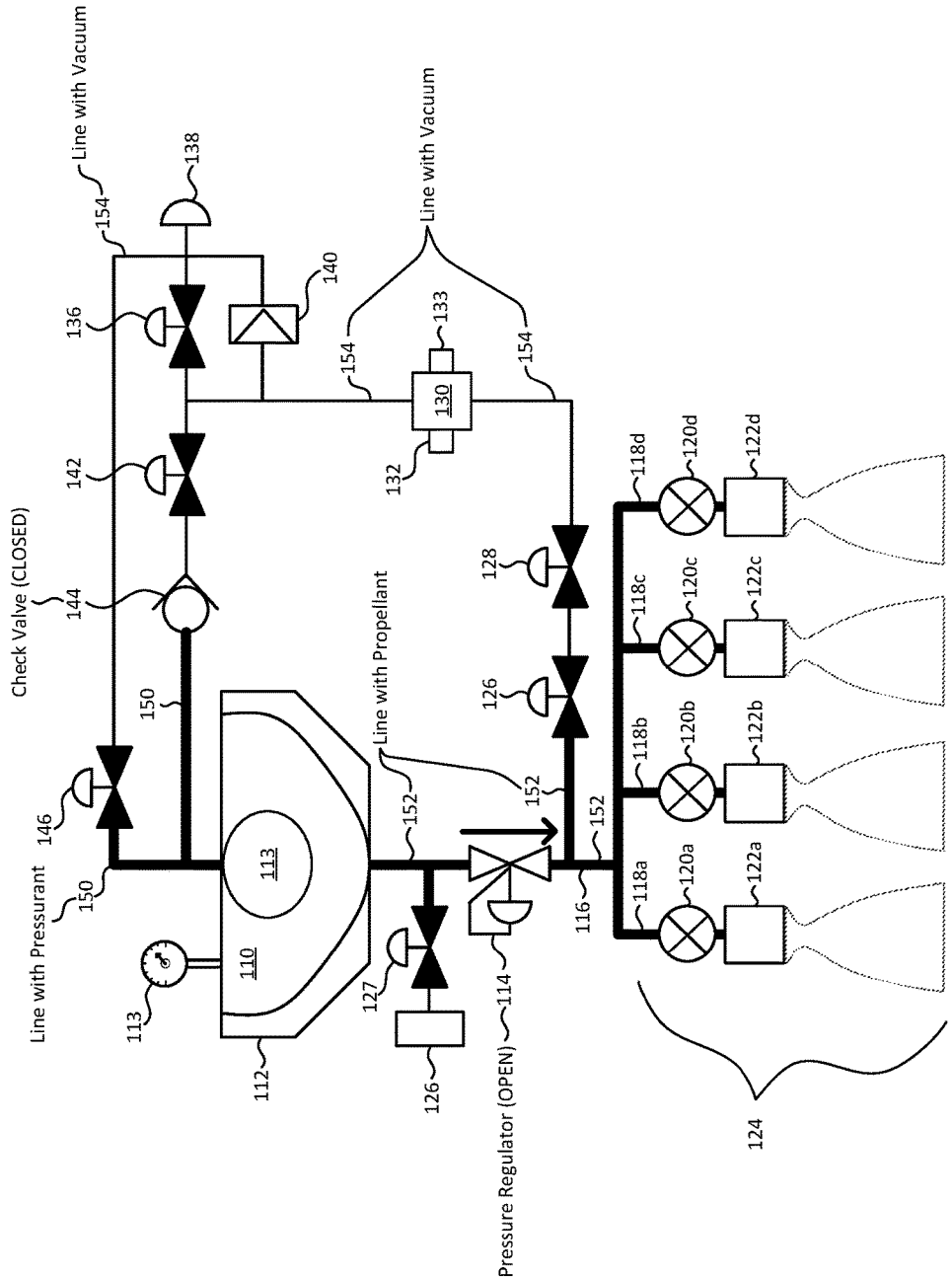
FIG. 2 is the system diagram of FIG. 1 in operational sequence during commissioning and standby phase.

Referring now to FIG. 2—for Commissioning and Standby: Pressure regulator 114 is opened. Propellant flows into system 100. System 100 is commissioned. System 100 is in standby mode (ready to fire thrusters).

Figure 3:
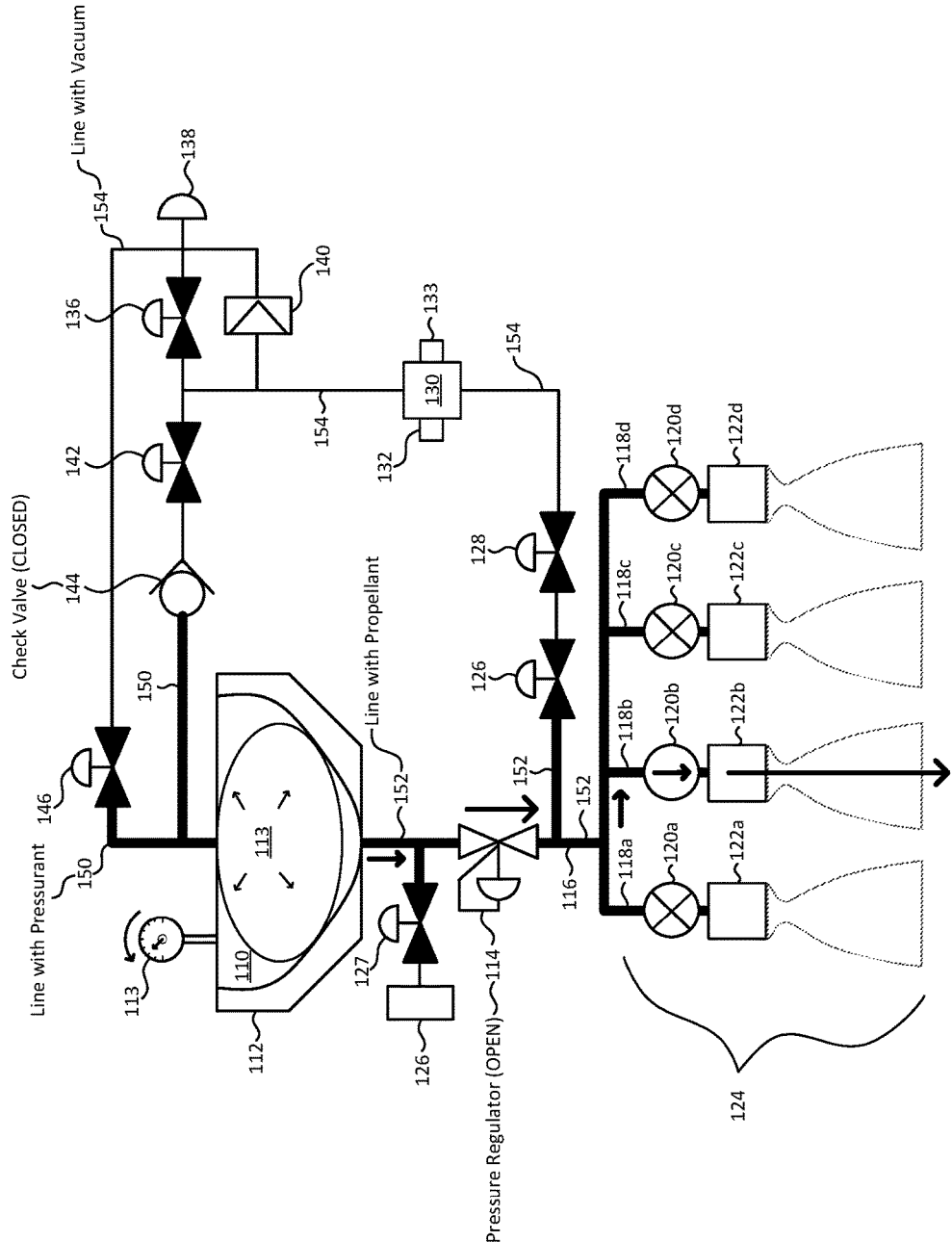
FIG. 3 is the system diagram of FIG. 1 in operational sequence during firing phase.

Referring now to FIG. 3—for Firing: Thruster valve 120*b* is opened. Propellant is delivered to thruster 122*b* via regulated pressure. Pressure 113 in tank 110 diminishes as fixed pressurant quantity expands to fill increased tank ullage 111.

Figure 4:
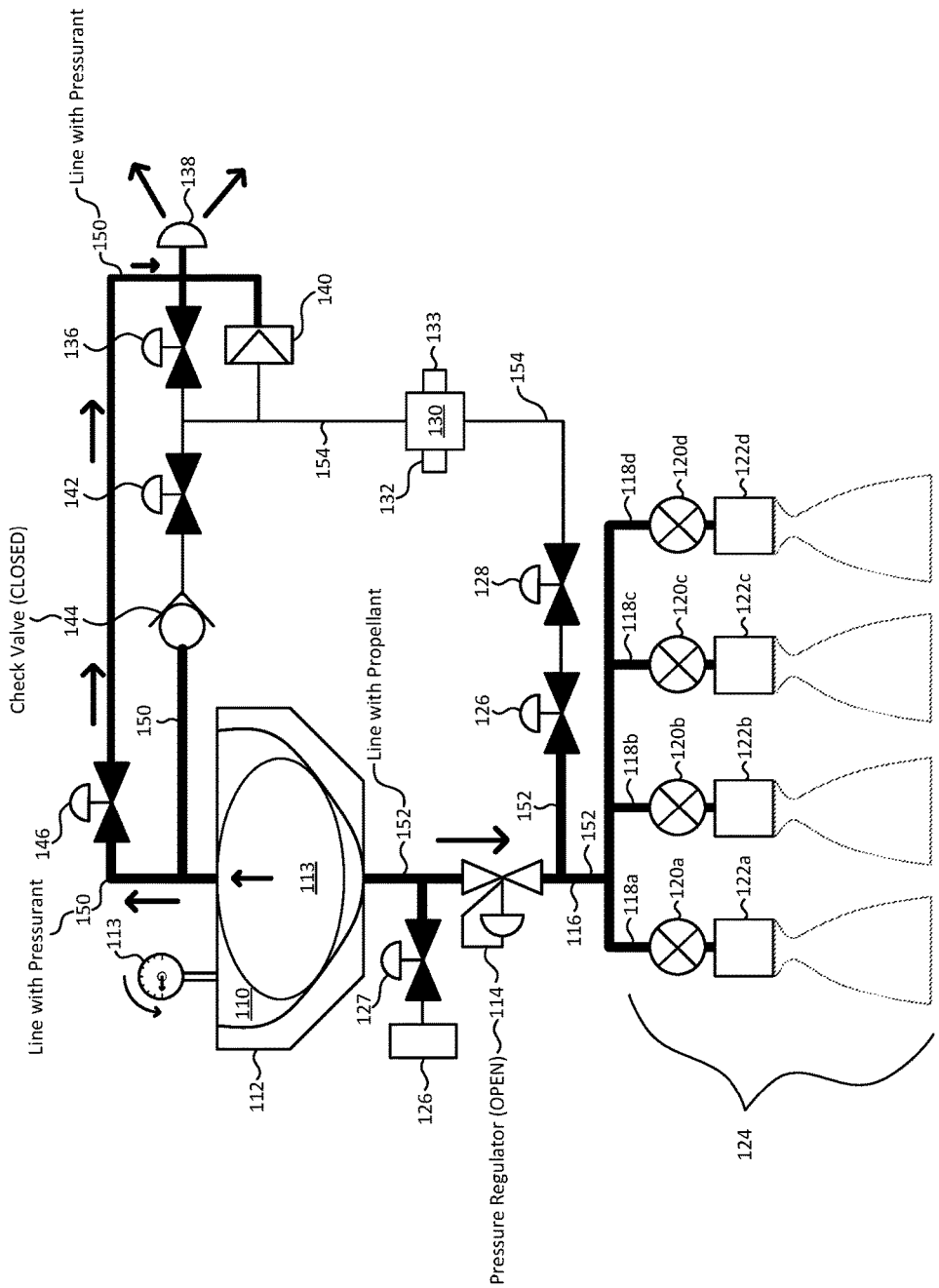
FIG. 4 is the system diagram of FIG. 1 in operational sequence during pressurant vent pre-refueling.

Referring now to FIG. 4—for Pressurant Vent Pre-Refueling: After many burns, pressure 113 in tank 110 is low and tank 110 is nearly empty. Refueling is required. Venting pressurant prior to refueling enables an easy blowdown propellant transfer process. Tank pressurant vent valve 146 is opened. Pressurant escapes via vent 138. Pressure 113 in tank 110 decreases. Tank pressurant vent valve 146 is closed when desired pressure 113 in tank 110 is reached.

Figure 5:
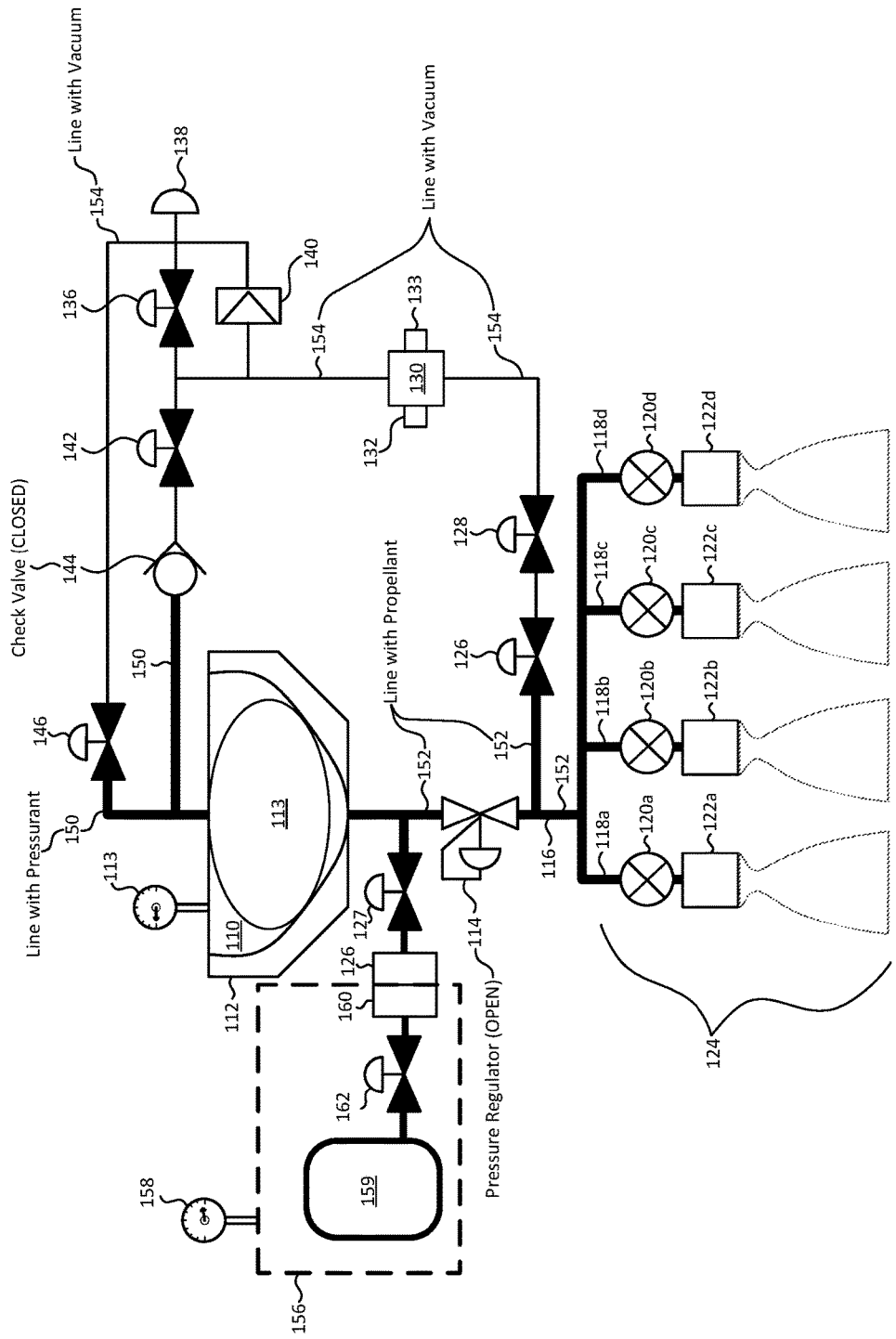
FIG. 5 is the system diagram of FIG. 1 in operational sequence during dock with a servicer spacecraft pre-refueling.

Referring now to FIG. 5—for Dock Pre-Refueling: Servicer spacecraft 156 docks via mating hardware 126 of system 100 and mating hardware 160 of servicer spacecraft 156. Fuel transfer valves 162, 127 are closed. Pressure 158 in servicer tank 159 is much higher than pressure 113 in conformal fuel tank 110 due to pressurant venting capability.

Figure 6:
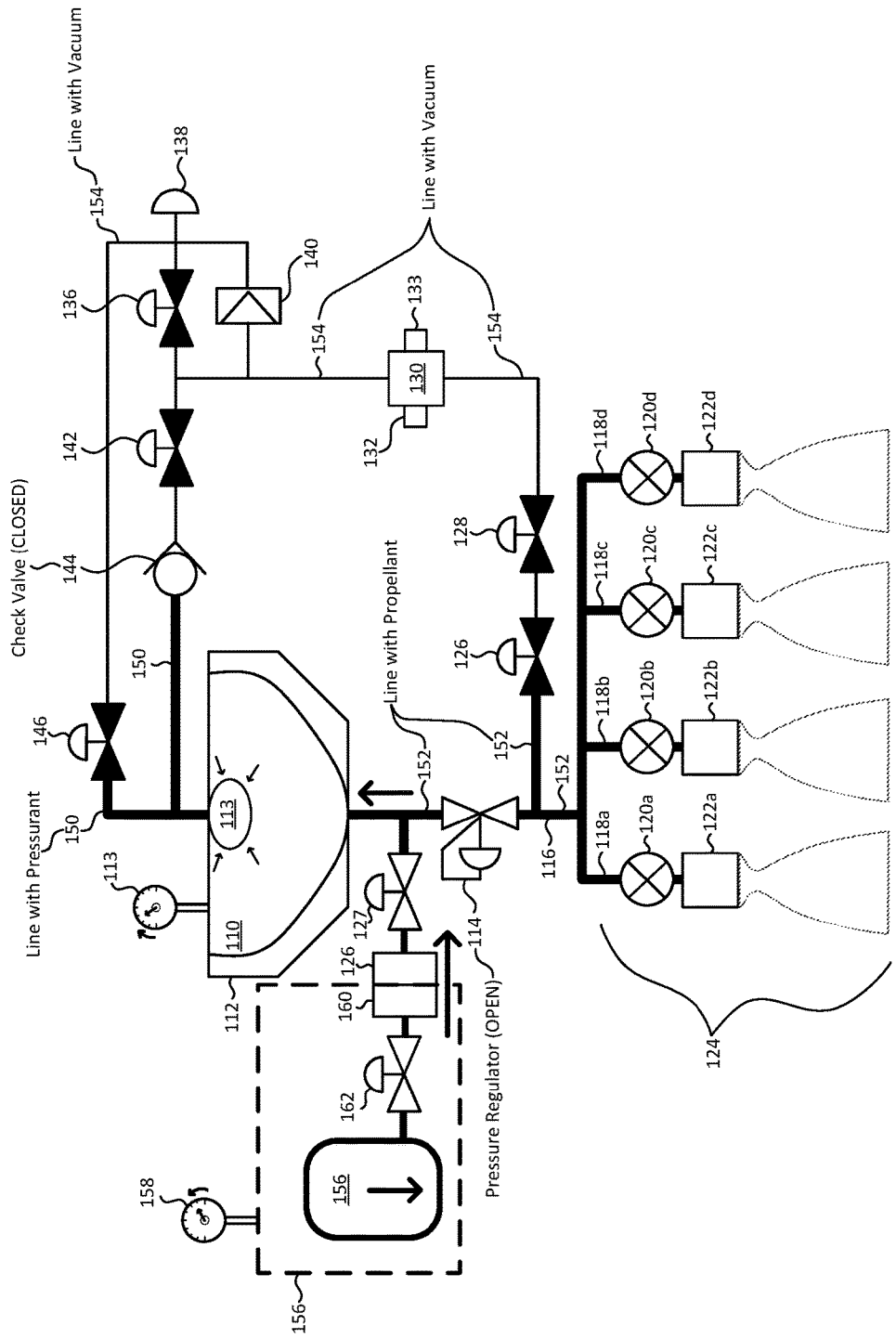
FIG. 6 is the system diagram of FIG. 1 in operational sequence during refueling.

Referring now to FIG. 6—for Refueling: Fuel transfer valves 162, 127 are opened. Pressure difference drives flow from Servicer tank 159 to conformal tank 110. Pressure 158 in servicer tank drops, pressure 113 in conformal tank 110 increases, but equilibrium is not reached before refueling is complete. When sufficient fuel has been transferred, close fuel transfer valves. Any of multiple means for measuring delivered quantity of fuel may be used, this hardware may be located on the servicer. A flow restrictor such as an orifice, capillary tube, or metering valve may be used to moderate fuel transfer rates. Note that this refueling sequence has the A2P2 spacecraft as the client, but the same A2P2 system can be used as a servicer to another system, with or without A2P2. Thus, A2P2 enables highly flexible androgynous refueling operations.

Figure 7:
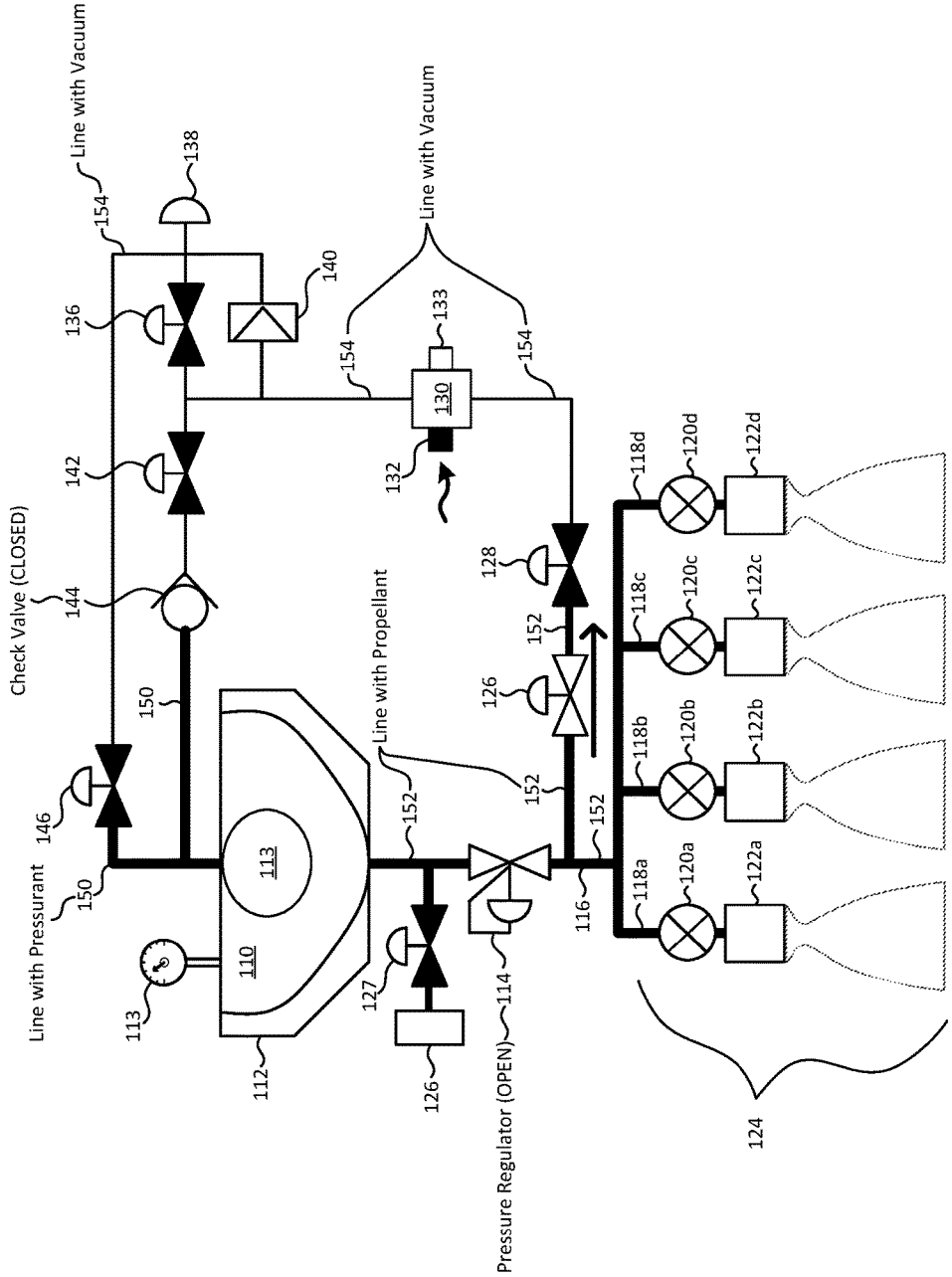
FIG. 7 is the system diagram of FIG. 1 in operational sequence after refueling and during re-pressurizing including filling the propellant extraction chamber and warming up the catalytic converter beds.

Referring now to FIG. 7—for Repressurizing—fill prop extraction chamber & warm up Cat beds: Servicer 156 leaves. Pressure in conformal tank 110 is too low to drive prop through the prop system, and re-pressurization is needed. Re-pressurization process begins. Open upstream Propellant Extraction Valve 126. Designed volume of propellant is contained in the propellant extraction chamber defined between the propellant extraction valves 126, 128. Turn on cat bed heaters 132 to warm up cat beds 130 to catalytic reaction temperature.

Figure 8:
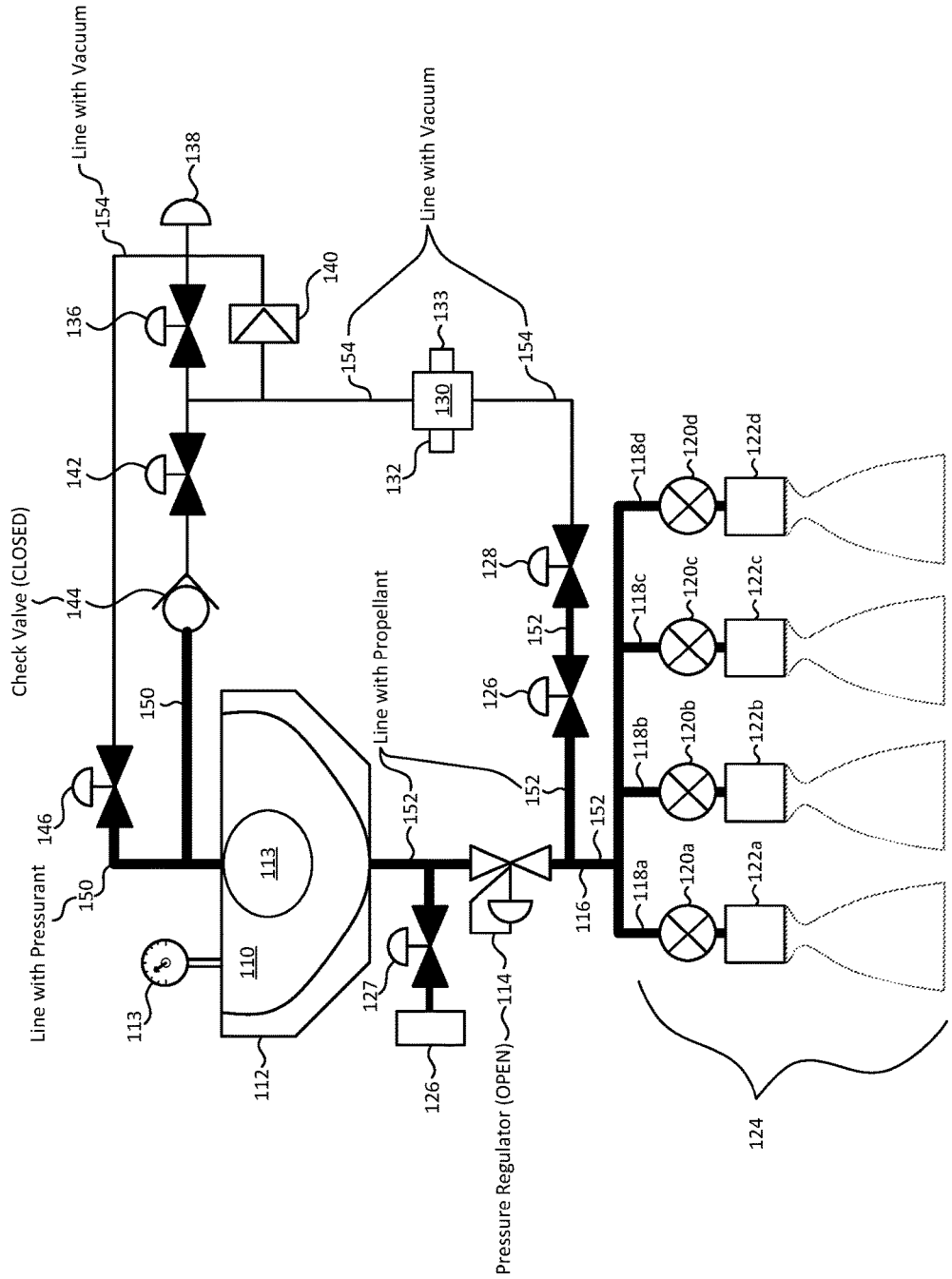
FIG. 8 is the system diagram of FIG. 1 in operational sequence during re-pressurizing including closing the propellant extraction chamber.

Referring now to FIG. 8—for Re-pressurizing—close prop extraction chamber: Close upstream propellant extraction valve 126. Propellant extraction chamber is now closed. Do not leave the propellant extraction chamber closed for long, and do not let the chamber warm up while it is closed as the propellant is in hydrostatic lock and may rupture the chamber. Compliance may be added to the chamber via means of a pop-tab or bellows to mitigate the risk of chamber rupture. Designed valving command sequence can insure that the chamber is only closed for a few seconds.

Figure 9:
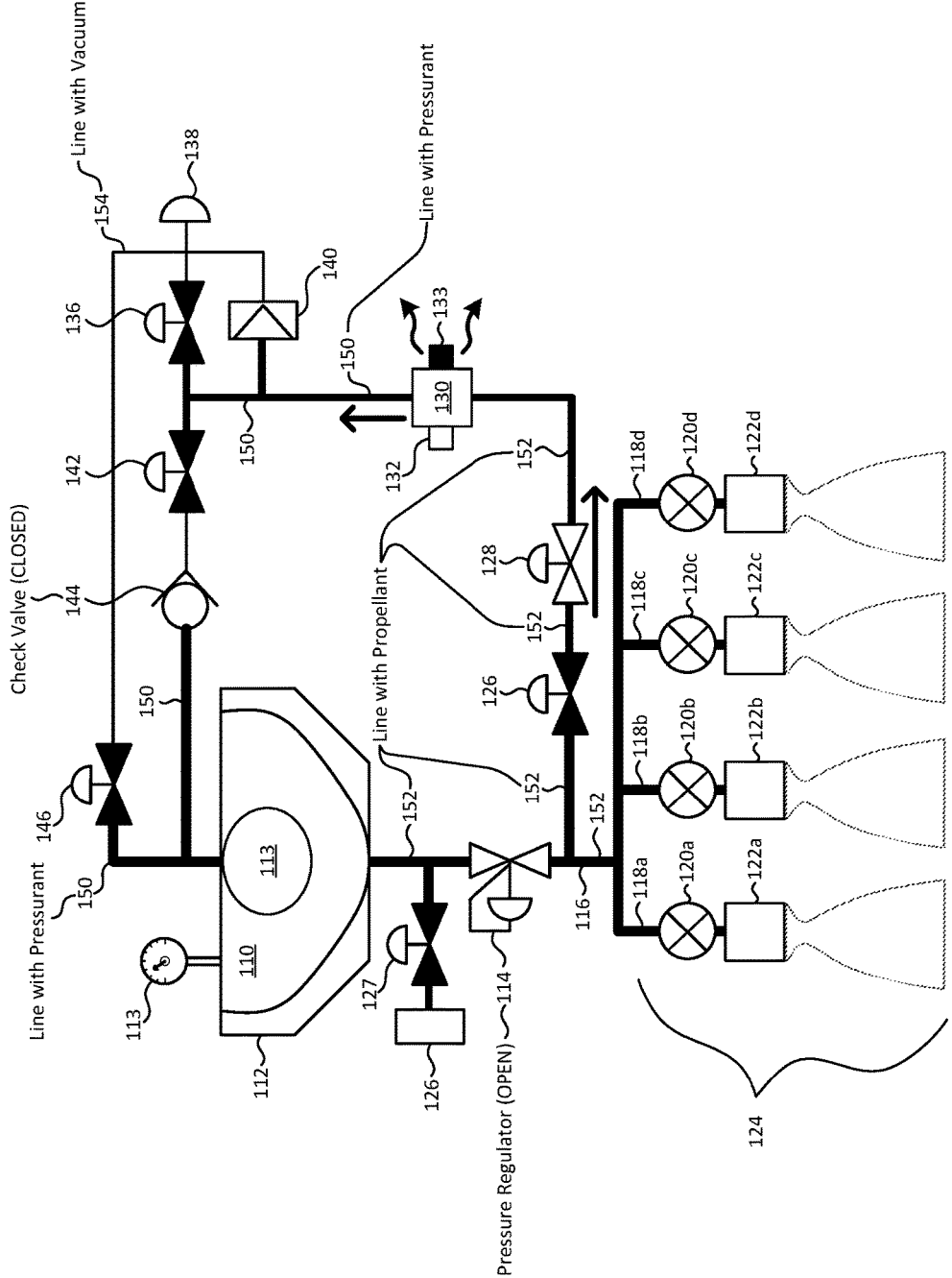
FIG. 9 is the system diagram of FIG. 1 in operational sequence during re-pressurizing including decomposing propellant and managing operating temperatures of propellant, produced pressurant, and the cat bed itself.

Referring now to FIG. 9—for Re-pressurizing—decompose prop: Open downstream propellant extraction valve 128. Propellant is released to the pressurant producing cat bed 130. Cat bed 130 decomposes liquid prop into gas decomposition products. Pressure in chamber of cat bed 130 increases. Cat bed 130 heats up. Heat in cat bed 130 sunk to thermal radiator 133. Cat bed 130, prop quantity, and thermal control system are co-designed to manage operating temperatures of prop, produced pressurant, and cat bed 130.

Figure 10:
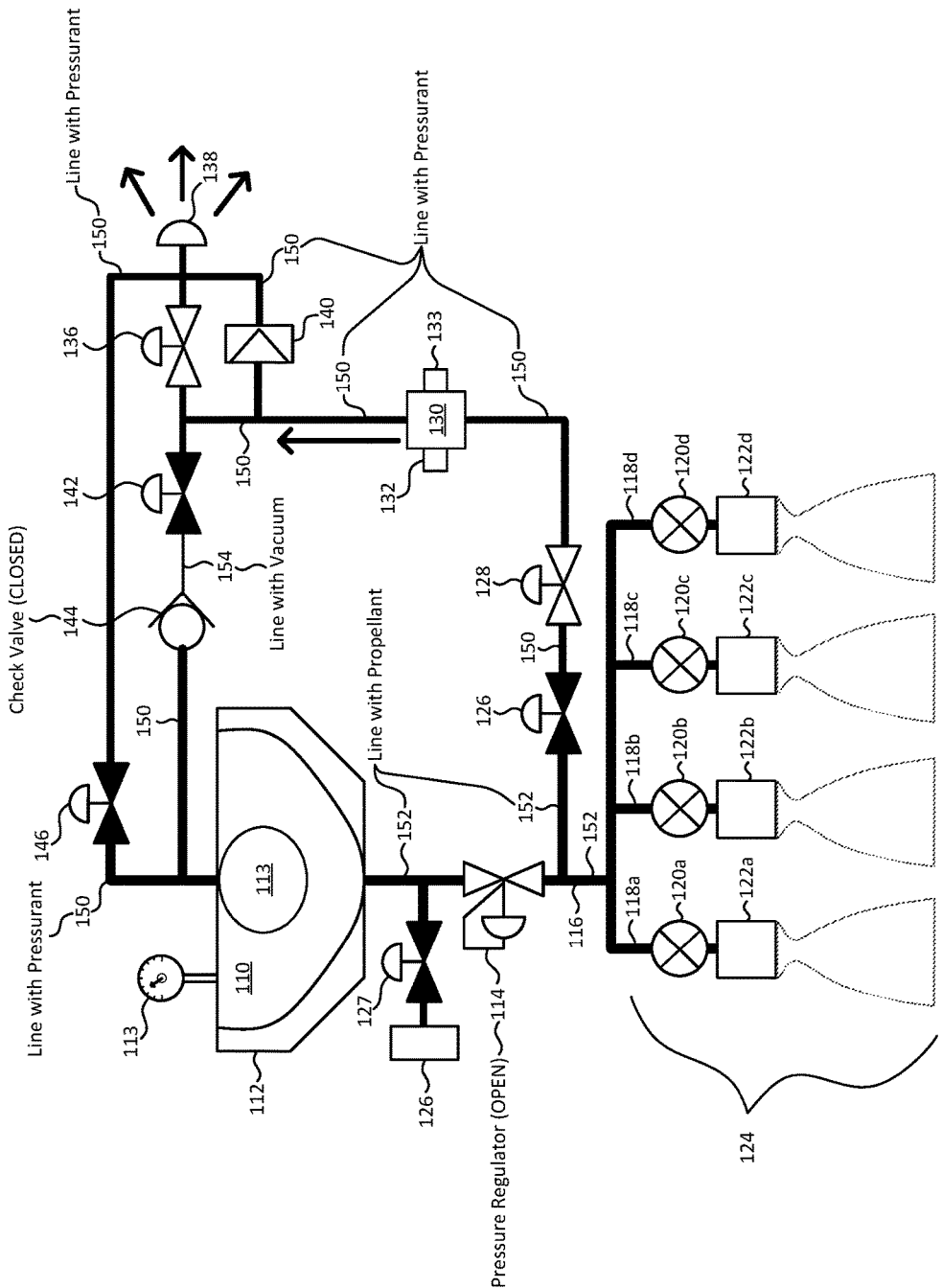
FIG. 10 is the system diagram of FIG. 1 in operational sequence during re-pressurizing including metering pressurant by measuring pressure in cat bed chamber and calculating desired pressure therein along with desired temperature and opening the pressurant metering vent valve to vent any excess gas beyond that required by the tank.

Referring now to FIG. 10—for Re-Pressurizing—meter pressurant: Allow propellant to cool down to equilibrium; Measure pressure in chamber of cat bed 130; Calculate desired chamber pressure of cat bed 130 according to ideal gas law and desired tank pressure. Open pressurant metering vent valve 136 to vent any excess gas beyond that required by the tank 110.

Figure 11:
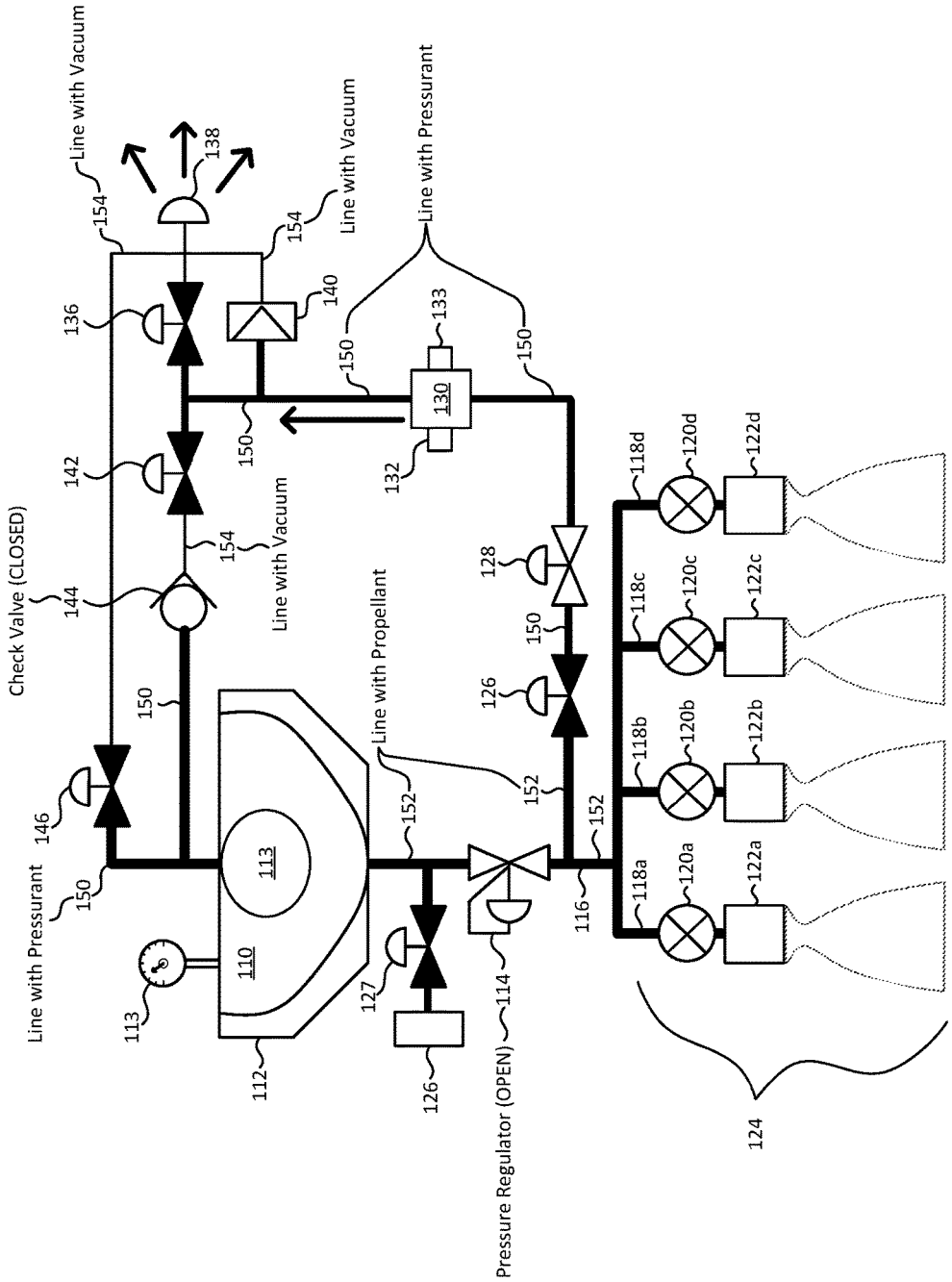
FIG. 11 is the system diagram of FIG. 1 in operational sequence during re-pressurizing including closing the pressurant metering vent valve when appropriate pressure is reached.

Referring now to FIG. 11—for Re-pressurizing—close pressurant vent valve: Close Pressurant Metering Vent Valve 136 when appropriate pressure is reached. A flow restrictor such as an orifice, capillary tube, or similar may be beneficial in managing the flow rate. Flow restrictor selection should take into account the aperture size and risks of clogs.

Figure 12:
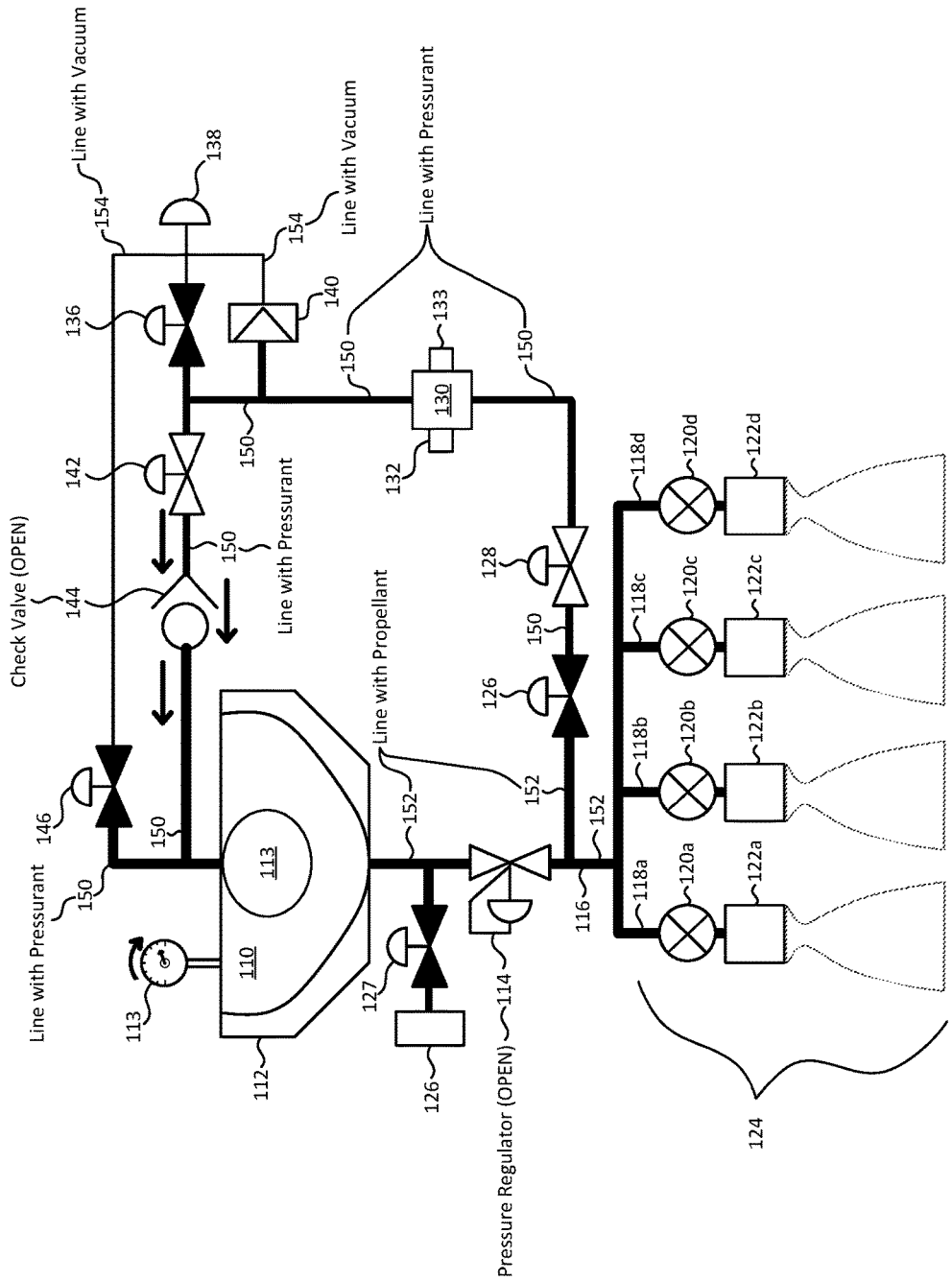
FIG. 12 is the system diagram of FIG. 1 in operational sequence during re-pressurizing including delivering new pressurant to tank.

Referring now to FIG. 12—for Re-Pressurizing—deliver new pressurant to tank: Open repressurizing valve 142. Check valve opens. Check valve prevents backflow in other situations by staying closed. Tank 110 receives additional pressure. System 100 is now repressurized. System 100 is ready for new burns.

Figure 13:
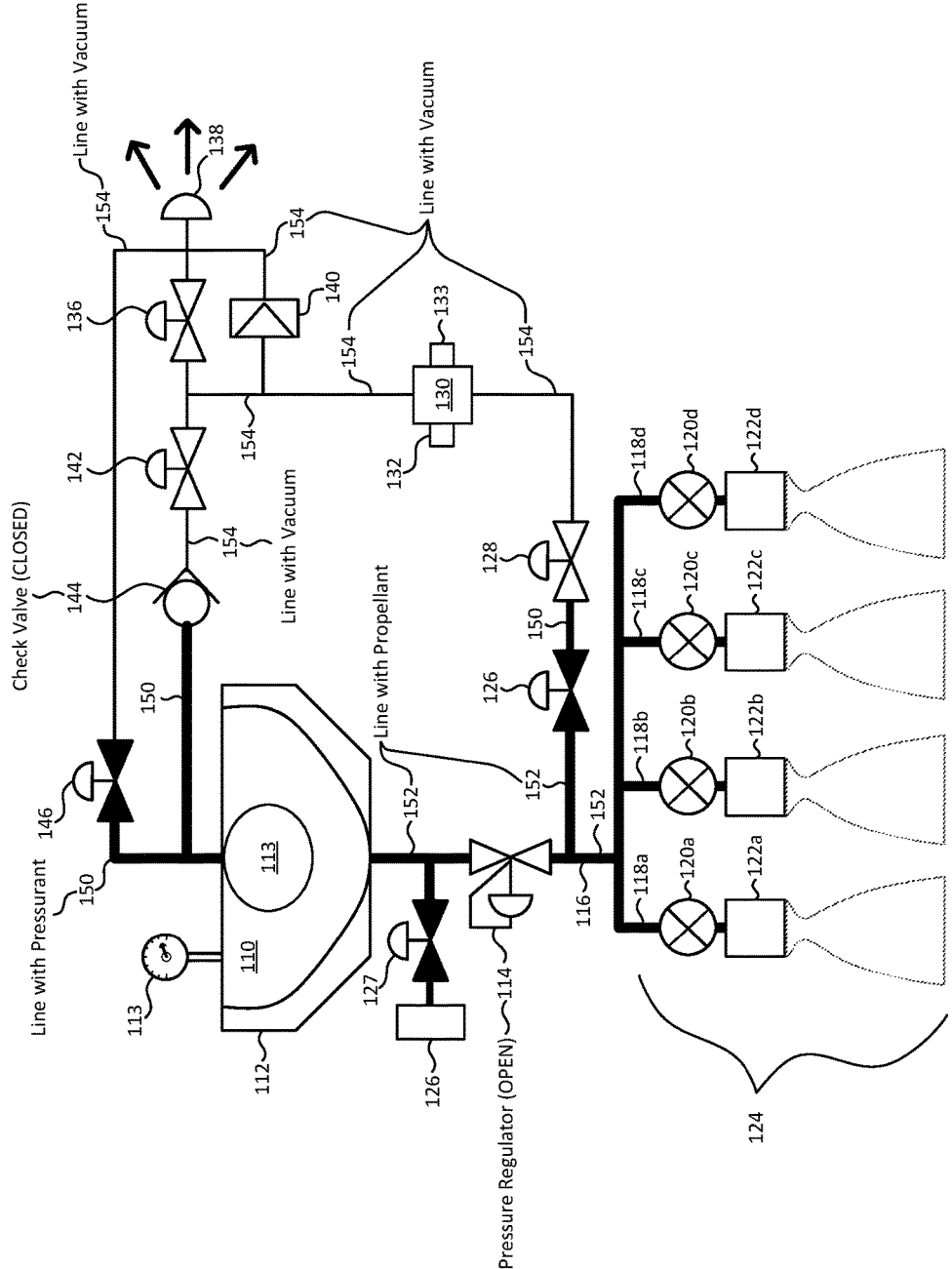
FIG. 13 is the system diagram of FIG. 1 in operational sequence during venting residual pressurant from repressurizing cat bed chamber and evacuating the repressurizing subsystem.

Referring now to FIG. 13—for Vent Residual Pressurant from Repressurizing Cat Bed Chamber: Fully open pressurant metering vent valve 136. Check valve 144 closes. Residual pressurant is vented. Repressurizing subsystem is now evacuated. Repressurizing subsystem should always be evacuated prior to the next repressurization event to ensure consistent performance from one repressurization event to the next.

Figure 14:
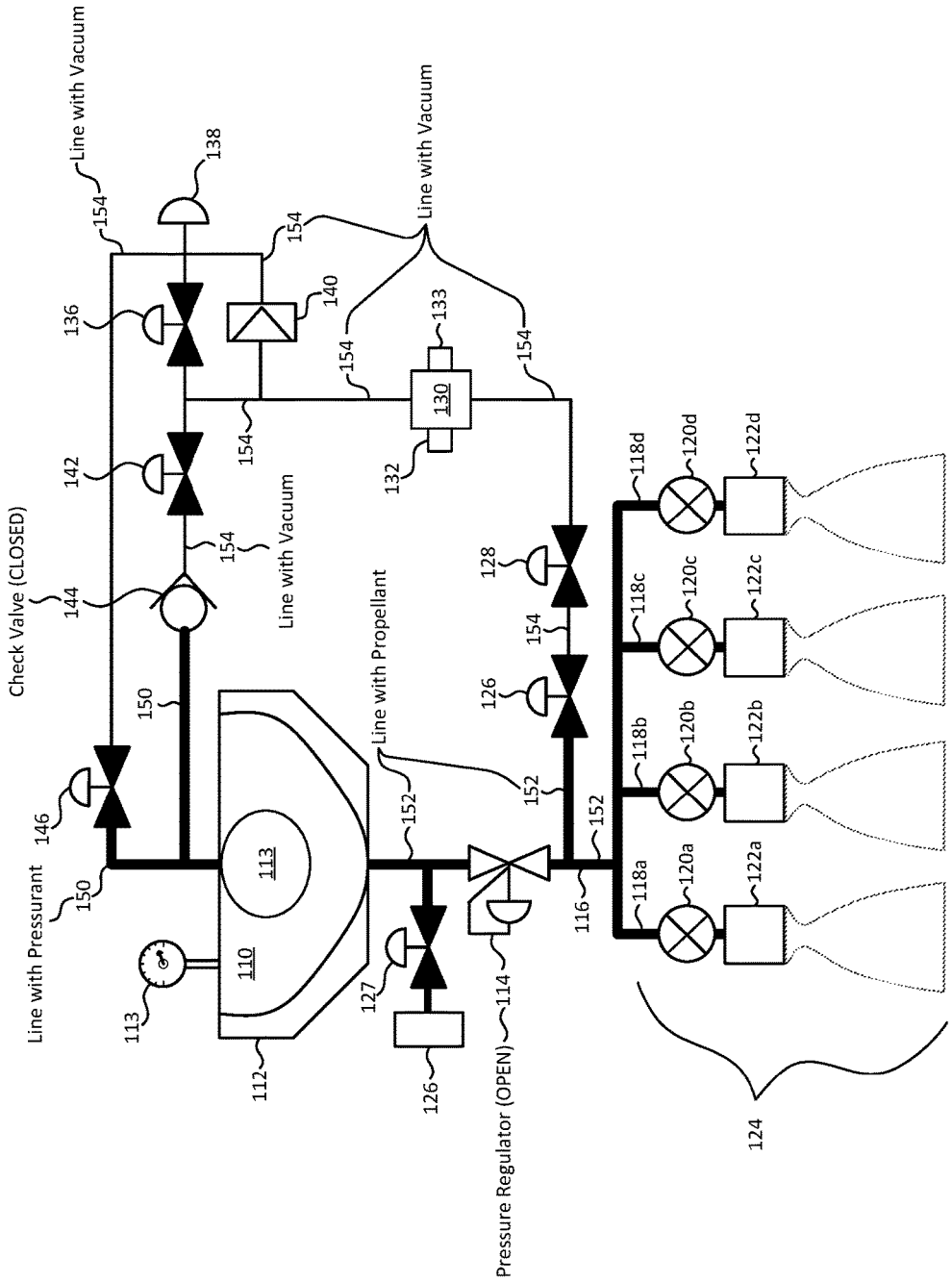
FIG. 14 is the system diagram of FIG. 1 in operational sequence including resetting valve positions to standby.

Referring now to FIG. 14—for Reset Valve Positions to Standby: Close repressurizing valve 142. Close downstream propellant extraction valve 128. Close pressurant metering vent valve 136. Repressurizing subsystem is now in standby mode. System 100 is now in standby mode.

Note that this sequence showed a refueling event immediately followed by a repressurization event, this is a normal operational sequence but an additional normal operational sequence would be to perform multiple repressurizations on a single tank of fuel. Designs that use this approach could achieve lower operational pressures (safety, mass), conformal tanks (better volume efficiency), and less ullage (better volume efficiency).

Figure 15:
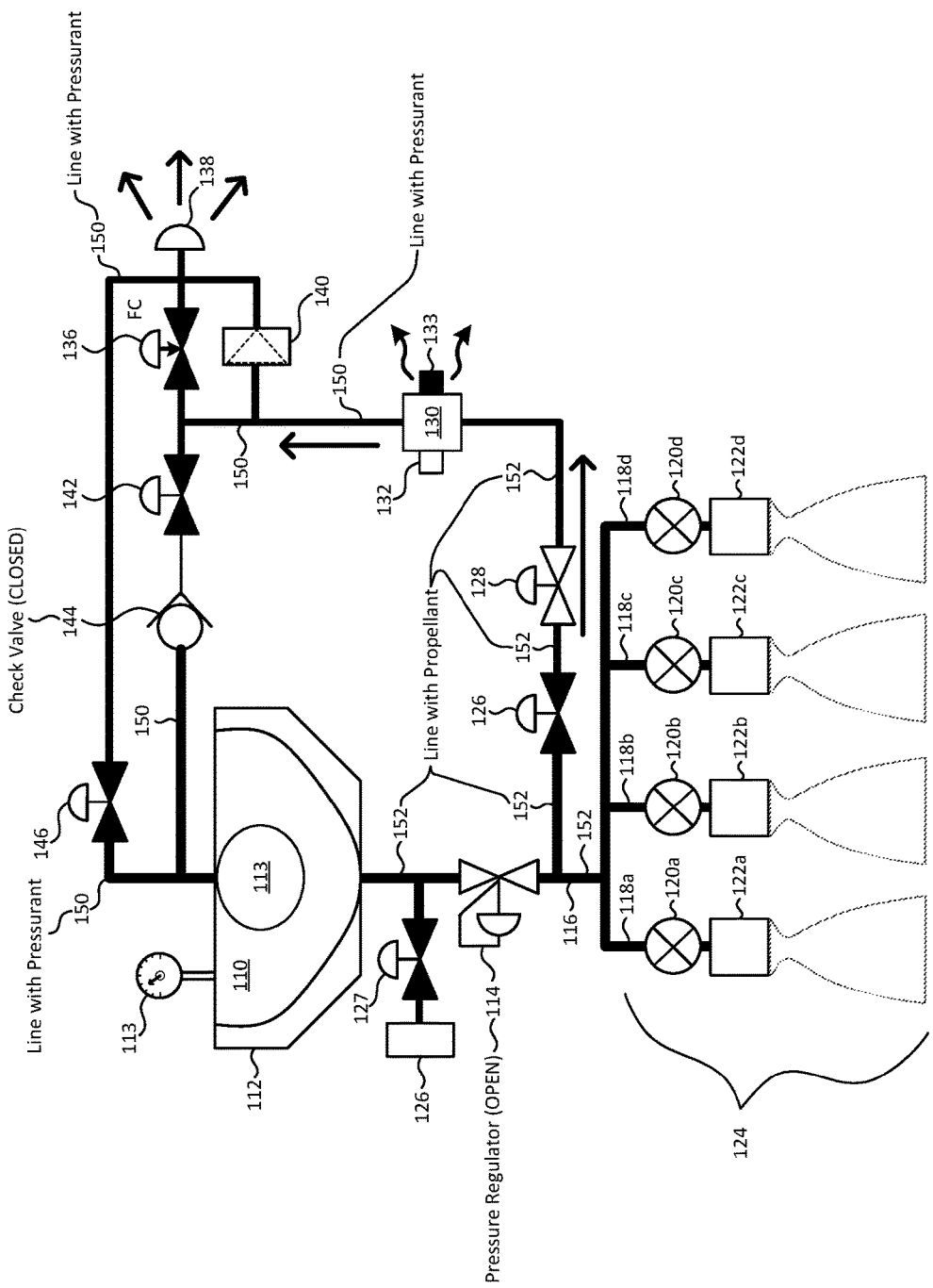
FIG. 15 is the system diagram of FIG. 1 in operational sequence during repressurizing including management of emergency over-pressurization; and It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

Referring now to FIG. 15—for Re-Pressurizing—Emergency Overpressurization: If there is an emergency event that results in an overpressurization of the chamber in cat bed 130. Pressurant metering vent valve 136 may be commanded open by either ground control or as an autonomous response to detected overpressurization. If, for any reason, the pressurant metering vent valve 136 fails to open, the burst disk 140 ruptures, releasing the overpressure.

Careful detailed design is required for the pressurant producing cat bed (PPCB) 130 in terms of its volume, the mass of delivered propellant for conversion to pressurant, cat bed size, cat bed operating temperatures, and all other aspects that affect the thermodynamics of the PPCB.

Some discussion of the manner in which A2P2 may be used is in order.

The onboard pressure generation capability of A2P2 means it can operate at a low pressure which permits the use of conformal tanks. Another benefit of the onboard pressure generation capability is that pressurant can be generated multiple times throughout the use of a single tank of fuel (i.e. multiple repressurizations between refuelings). This enables the A2P2 system to use a small initial ullage to achieve maximum propellant storage capability.

A2P2 uses typical materials and processes (M&P) for commonly used in-space propulsion today. Thus the process for making A2P2 is readily apparent to those skilled in the art and there is no particular novelty in the manufacturing process. The primary novelty of A2P2 is in the selection, arrangement, and configuration of existing flow elements to create new capabilities with specific, valuable utility on spacecraft.

Either PED or PMD tanks can be used. PMD permits desirable conformal tanks, but PED eliminates questions of soluted decomposition products from poisoning the cat beds.

A warm gas propulsion system could be integrated into the PPCB if the potential achievable deltav (change in space vehicle velocity, aka delta velocity or Δ velocity) is seen to be worth the trouble of designing such a system including considerations of the mass and cost.

Orifices, metering valves, or other flow restrictor elements may be placed on prop lines that go to servicers and/or clients to moderate flow rates in case large initial pressure differences are anticipated. An adjustable metering valve permits a balance of stable flow and high flow through rate throughout refueling. Similar flow restrictor elements may be helpful at the exit from the PPCB to the tank ullage for similar reasons. Flow restrictor elements on the line going to the vent or the three branches converging on the vent can also be helpful for the same reasons.

Although envisioned for use with green propellants, examples according to the present disclosure can also be used with heritage monoprops such as hydrazine, or even with bipropellant systems, provided that concerns about admixture of decomposition products with propellants can be managed.

Spacecraft using green propellants and incorporating an electric propulsion (EP) thruster for use with the green propellant can be also incorporated into A2P2 without any issue. Moreover, a purely EP spacecraft could also deliver liquid EP propellant to the EP thrusters via A2P2.

The inlet to the PPCB is nominally downstream of the pres reg but could be upstream of the pres reg. The nominal position is so as to insure that prop entering the prop extraction chamber is at a consistent pressure no matter what the circumstances of the tank. However, upstream of the pres reg could provide higher pressures, if this is seen as a virtue.

Examples according to the present disclosure are useful for any spacecraft using in-space propulsion. It is particularly useful for spacecraft requiring the ability to refuel and/or be refueled.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for managing propellant and pressurant for in-space propulsion of a spacecraft, the system comprising:
a conformal fuel tank for propellant storage and distribution, wherein the tank further comprises:
an ullage operatively connected to the conformal fuel tank for pressurization thereof, and
a propellant management device (PMD) within the conformal fuel tank, the propellant management device to wick propellant to a liquid port of the conformal fuel tank;
a pneumatic circuit, the pneumatic circuit having a series of conduit subsystems for fluid transport and storage of propellant and pressurant further comprising:
a tank pressurant vent valve for adjustment of operating pressure prior to refueling operations;
a vent to release excess pressurant;
a pressurant metering vent valve to provide control and safety relief for the pressurant;
a check valve to prevent backflow into a pressurant cat bed for decomposing propellant into pressurant, the check valve operatively connected between the conformal fuel tank and a repressurizing valve, the repressurizing valve to release pressurant once cooled, the repressurizing valve operatively connected between the check valve and the pressurant producing cat bed;
a burst disk to provide overpressure safety relief for the pressurant, the burst disk operatively connected between the pressurant-producing cat bed and the conformal fuel tank operatively positioned in parallel with the pressurant metering vent valve; and
a series of propellant extraction valves to intake a predetermined quantity of propellant for decomposition, the series of propellant extraction valves operatively connected between the pressurant-producing cat bed and a pressure regulator that delivers proper pressure to a series of thrusters, the series of thrusters to propel a spacecraft.

* * * * *